United States Patent [19]

Niikawa

[11] Patent Number: 5,020,927
[45] Date of Patent: Jun. 4, 1991

[54] GROUPING OF DOT DATA IN A MULTIPLE COLUMN DOT-MATRIX PRINTER

[75] Inventor: Takeshi Niikawa, Nagoya, Japan

[73] Assignee: Brother Kogyo Kabushiki Kaisha, Japan

[21] Appl. No.: 385,995

[22] Filed: Jul. 27, 1989

Related U.S. Application Data

[63] Continuation of Ser. No. 122,838, Nov. 19, 1987, abandoned.

[30] Foreign Application Priority Data

Nov. 21, 1986 [JP] Japan .................. 61-279097

[51] Int. Cl.⁵ ............................. B41J 2/51
[52] U.S. Cl. ......................... 400/121; 101/93.04
[58] Field of Search .................... 400/121, 124; 101/93.04, 93.05

[56] References Cited

U.S. PATENT DOCUMENTS

| | | | |
|---|---|---|---|
| 3,627,096 | 12/1971 | Finnegan | 400/124 |
| 4,010,835 | 3/1977 | Martin et al. | 400/124 |
| 4,079,824 | 3/1978 | Ku | 400/124 |
| 4,167,342 | 9/1979 | Mower et al. | 400/124 |
| 4,169,683 | 10/1979 | Bernardis et al. | 400/124 |
| 4,347,518 | 8/1982 | Williams | 400/120 X |
| 4,653,941 | 3/1987 | Suzuki | 400/121 |
| 4,683,818 | 8/1987 | Hewlett | 400/121 X |
| 4,758,103 | 7/1988 | Angst | 400/121 |

FOREIGN PATENT DOCUMENTS

| | | | |
|---|---|---|---|
| 53-145727 | 12/1978 | Japan | 400/124 |
| 57-5185 | 1/1982 | Japan | 400/121 |
| 57-43428 | 9/1982 | Japan | 400/124 |

OTHER PUBLICATIONS

IBM Tech. Disc. Bulletin, vol. 29, No. 3, Aug. 1986, pp. 1304-1305.

*Primary Examiner*—David A. Wiecking
*Assistant Examiner*—Steven S. Kelley
*Attorney, Agent, or Firm*—Oliff & Berridge

[57] ABSTRACT

A control system for a dot printer having a printing head mounting at least two printing elements thereon per row along a moving direction of the printing head. The printing elements are selectively driven according to a moving position of the printing head to print a dot at a desired column position on a printing paper. The control system comprises a grouping means for grouping dot data to be printed into two groups, wherein the grouping means first groups into one of the two groups the dot data to be printed at column positions spaced a distance equal to or greater than a moving distance of the printing head during a period when the same printing element can be driven, and secondly groups into the other group the remaining dot data not grouped in the first grouping step; and a driving means for driving the printing element assignable to each group on the basis of the data grouped to each group. The dots are assigned independently of what column they are in.

20 Claims, 9 Drawing Sheets

| THE NUMBER OF COLUMN | 0 | 1 | 2 | 3 | 4 | 5 | 6 | 7 |
|---|---|---|---|---|---|---|---|---|
| PRINT DOT DATA | 0 | 1 | 0 | 1 | 0 | 1 | 0 | 1 |
| IMAGE BUFFER OF GROUP (1) | 0 | 1 | 0 | 0 | 0 | 1 | 0 | 0 |
| IMAGE BUFFER OF GROUP (2) | 0 | 0 | 0 | 1 | 0 | 0 | 0 | 1 |

*FIG. 4*

```
FOR    K=1    TO    N-1

• GROUPING    SUBROUTINE    FOR    GROUP (K)
         IN    TERMS    OF    DOT    PATTERN    DATA

• SUBTRACT    IMAGE    BUFFER    OF    GROUP (K)
         FROM    PRINT    DOT    DATA    AT    EVERY    BIT

• SET    THE    SUBTRACTED    DATA    AS    A    NEW
         DOT    PATTERN    DATA

NEXT

• ADOPT    THE    DOT    PATTERN    DATA
         OBTAINED    AS    A    DATA    OF    IMAGE    BUFFER
         OF    GROUP (N)
```

*FIG. 5*

EXCLUSIVE OR

| | PRINT DATA IS NOT PRESENT AT ANY ONE OF JUST ANTECEDENT (2N-1) COLUMNS  D = 0 | PRINT DATA IS PRESENT AT ANY ONE OF JUST ANTECEDENT (2N-1) COLUMNS  D = 1 |
|---|---|---|
| DATA IN THE C-TH COLUMN  1 | 1 | 0 |
| THE DATA IN THE C-TH COLUMN  0 | 0 | 1 |

*FIG. 7*

GROUPING OF DOT DATA IN A MULTIPLE COLUMN DOT-MATRIX PRINTER

This is a continuation of U.S. appl. Ser. No. 07/122,838 filed Nov. 19, 1987, abn.

BACKGROUND OF THE INVENTION

The present invention relates to a dot-matrix type printer, and more particularly to a printer having at least two sets of printing elements.

A dot-matrix printer is one which forms characters from a plurality of dots arranged in rows and columns. One format known in the prior art utilizes a 7×7 matrix, that is, a matrix 7 dots high by 7 dots wide.

A conventional way of printing such characters is to force the ends of wires, or styli, into contact with a printing medium such as an inked ribbon, which in turn makes dot marks on paper. The arrangement of the dots within the matrix conveys the form of the characters. The styli are electromagnetically driven and one popular embodiment includes the styli arranged in columnar from, i.e. a column of 7 styli. The printing line is scanned at constant speed and the styli at appropriate rows in the column are actuated at the appropriate times to form the desired characters.

The maximum printing speed of dot matrix printing systems is related to the maximum allowable repetion rate of dots formed along any given horizontal line. If dots can be formed at the rate of 1000 per second, one character (in a 7×7 matrix format) is printed for 7/1000 second.

The printing speed can be doubled by arranging the styli in two columns. Such a system is disclosed in U.S. Pat. No. 4,079,824, for example. Further, the use of plural columns of styli is disclosed in U.S. Pat. Nos. 3,627,096, 4,010,835 and 4,169,683, Japanese Patent Publication No. 57-43428, and Japanese Patent Laid-Open Publication No. 53-145727, for example.

Further, a technique using two columns of styli to quadruple a printing speed as compared with one column of styli is disclosed in U.S. Pat. No. 4,167,342. In this technique, the dots forming a character are assigned to two groups in such a manner that two or more dots within successive four columns are not assigned into a group. The styli in each column are actuated according to dots assigned to a group. Thus, the printing speed is quadrupled as compared with one column of styli. However, this technique requires the preliminarily design of a character generator for each of the two columns of styli per character.

SUMMARY OF THE INVENTION

It is an object of the present invention to provide a new and useful method of assigning dots to be printed to each set of printing elements wherein each set of printing elements includes one printing element in each row. It is not necessary to arrange each stylus in columns in such a manner as to lie on one line. According to the method of the present invention, it is not necessary to preliminarily group the dots per character, but automatic assignment can be achieved according to a certain program. Accordingly, in printing any special characters not incorporated in the printer (for example, special graphic characters or foreign characters required by users), the users need not group the dots.

Furthermore, the method is widely applicable to various type printers having two or more sets of printing elements. Further, the method can average the frequency of use of each set of printing element and extend a life of the printing head incorporating the printing elements.

The invention will be more fully understood from the following detailed description and appended claims when taken with the drawings.

BRIEF DESCRIPTION OF THE DRAWINGS

FIG. 4 is an illustration showing the result of the procedure shown in FIG. 3;

FIG. 5 is an exemplary procedure for grouping the print dots to N groups;

FIG. 7 is an exemplary converted data obtained in the procedure in FIG. 6;

DETAILED DESCRIPTION OF THE PREFERRED EMBODIMENTS

Figure 1:
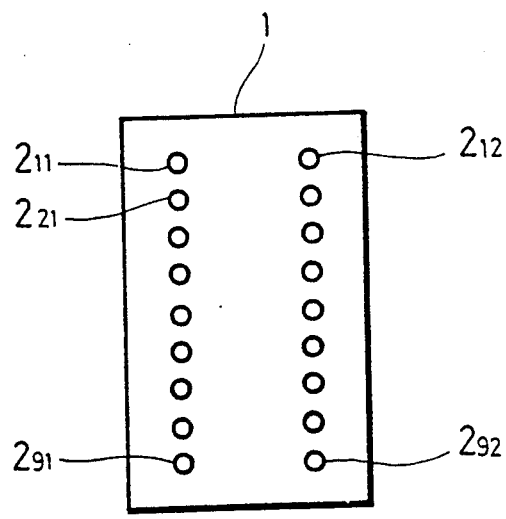
FIG. 1 is an exemplary printing head controllable by the present invention.

As shown in FIG. 1, a printing head 1 has two sets of printing styli $2_{11}$-$2_{91}$ and $2_{12}$-$2_{92}$, each set including nine styli at nine rows. That is, each set includes one stylus at each row. The printing head 1 is mounted on a carriage not shown and is movable across the width of a printing paper.

Figure 2:
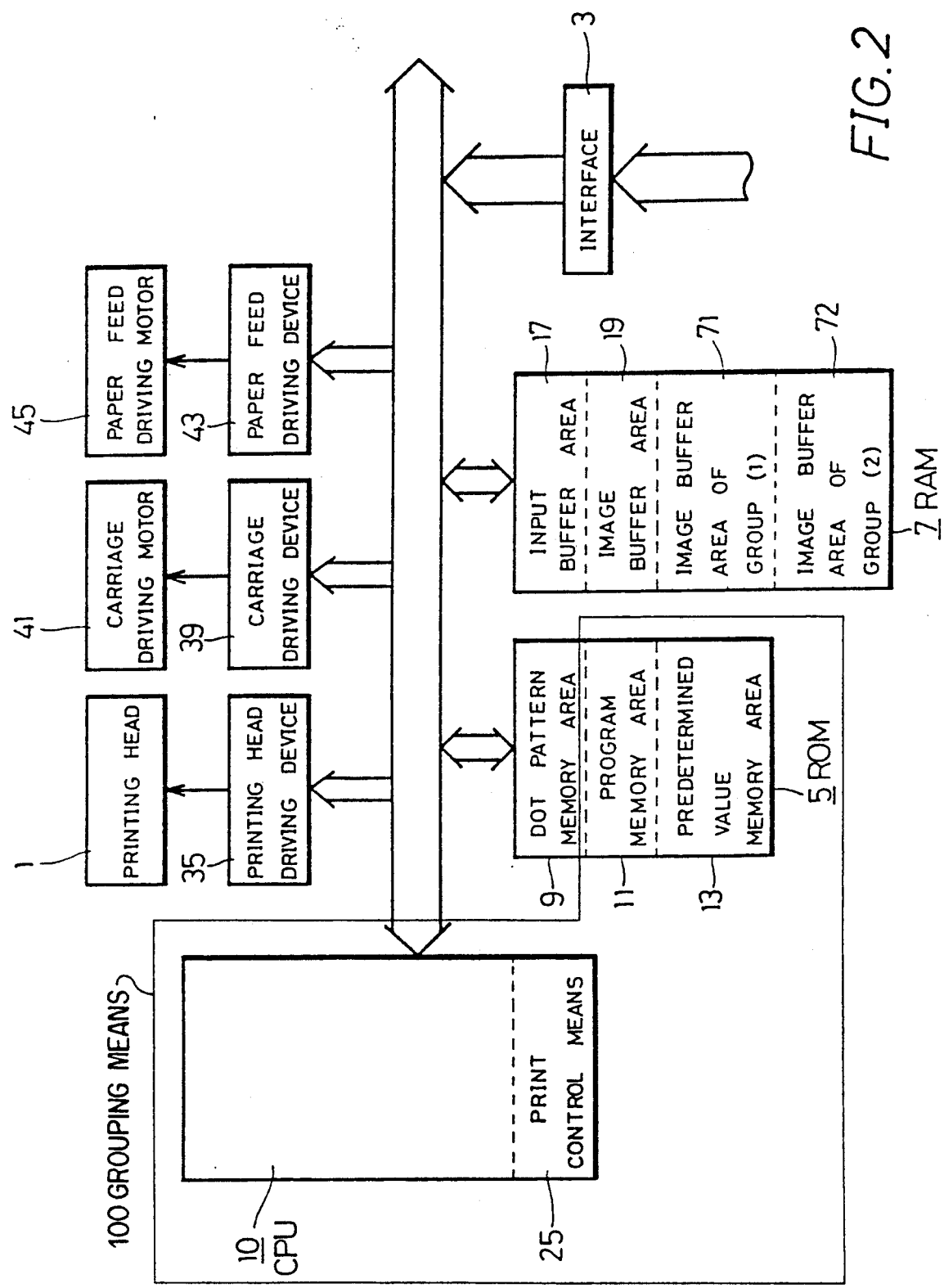
FIG. 2 is a block diagram of the control system of the present invention.

FIG. 2 shows a block diagram of the printer system in the preferred embodiment. A central processing unit (which will be hereinafter referred to as CPU) 10 is connected through an interface 3 to an external device such as a host computer (not shown), so as to input various data such as print character data and print command data from the external device.

CPU 10 is connected to ROM 5 and RAM 7. ROM 5 includes a dot pattern memory area 9, a program memory area 11, and a predetermined value memory area 13. The dot pattern memory area 9 preliminarily stores dot pattern data corresponding to various characters. The program memory area 11 preliminarily stores a program for executing a printing operation. The predetermined value memory area 13 preliminarily stores data required for printing operation control.

RAM 7 includes an input buffer area 17, an image buffer area 19, a group (1) image buffer area 71, and a group (2) image buffer area 72. In the embodiment shown in FIG. 2, the printing head includes two sets of printing elements. However, in an embodiment where the printing head includes N sets of printing elements, group (1) to (N) image buffer areas are included in RAM 7. Character data of one printing line are sequentially inputted through the interface 3 to the input buffer area 17, and are accumulated and stored in the input buffer area 17. The character data of one printing line stored in the input buffer area 17 are converted into data relating to print dot on the basis of dot pattern data stored in the dot pattern memory area 9 when CPU 10 receives a print command data from the external device, and the print dot data of one printing line as obtained above are stored in the image buffer area 19. The data structure in the image buffer are 19 is such that the value of pb 0 or 1 is stored at each bit corresponding to each intersection of a dot matrix as shown in FIG. 4 of Japanese Patent Laid-Open Publication No. 57-5185.

In FIG. 4, an example of the data structure in one row is shown in the area of "PRINT DOT DATA", wherein "1" denotes the presence of a dot and "0" denotes the absence of a dot. The data stored in the image buffer area 19 is grouped by the operation of the CPU 10 according to the program stored in the program memory area 11 of the ROM 5. The data thus grouped are stored in the image buffer area of group (1) 71 and the image buffer area of group (2) 72 of the RAM 7, respectively. Accordingly, as shown in FIG. 4, "1" in the print dot data is grouped into either the group (1) or the group (2), and is stored in the corresponding buffer 71 or 72. In executing the program, the predetermined value stored in the predetermined value memory area 13 of the ROM 5 is accessed. Thus, the grouping is executed by the program memory area 11 of the ROM 5, the program stored in the memory area 11, the CPU 10 to be operated under control by the program and the predetermined value memory 13 of the ROM 5 storing the predetermined value to be accessed in the operation of the CPU 10. That is, the grouping means 100 is constructed of these elements as shown in FIG. 2. Details of the program and the manner of use of the data stored in the buffers 71 and 72 will be hereinafter described. CPU10 includes a print control means 2S for driving the printing head 1, a carriage driving motor 41 and a paper feed driving motor 45, and controlling the printing operation.

A printing head driving device 35 is electrically connected to CPU 10, and the printing head 1 is electrically connected to the printing head driving device 35. As previously mentioned with reference to FIG. 1, the printing head 1 includes two sets of printing styli $2_{11}$-$2_{92}$, each set of printing styli being perpendicular to a printing line. The printing styli $2_{11}$-$2_{92}$ are contained in the printing head 1, and are selectively driven by the corresponding electromagnets (not shown). A carriage driving device 39 is electrically connected to CPU 10, and is adapted to drive the carriage driving motor 41 according to a carriage driving signal inputted. Thus, the carriage (not shown) mounting the printing head 1 thereon is adapted to travel along a printing line. A paper feed driving device 43 is electrically connected to CPU 10, and is adapted to rotate the paper feed driving motor 45 at each end of printing operation of one printing line according to a paper feed signal inputted, thereby feeding a printing paper (not shown) in a direction perpendicular to the printing line.

The operation of the printing device will now be described.

When power is supplied to the printing device, and CPU 10 is initialized to input the character data of one printing line from the external device such as a host computer, the character data of one printing line is stored in the input buffer area 17.

Next, when a print command data is inputted from the host computer or the like, the character data of one printing line stored in the input buffer area 17 is converted into a print dot data of one printing line on the basis of dot pattern data stored in the dot pattern memory area 9, and the print dot data is stored in the image buffer area 19.

For example, if the character data of one printing line is "A ... ", a dot pattern corresponding to the character "A" (See FIG. 11, for example) is first read from the dot pattern memory area 9, and is converted into a print dot data to be stored in the image buffer area 19. Next, the subsequent characters are similarly converted into print dot data, and are accumulated and stored in the image buffer area 19. Finally, the character data of one printing line are converted into print dot data, and are stored in the image buffer area 19.

Then, the print dot data of one printing line stored in the image buffer area 19 is grouped into two groups in accordance with the following grouping procedure.

Figure 3:
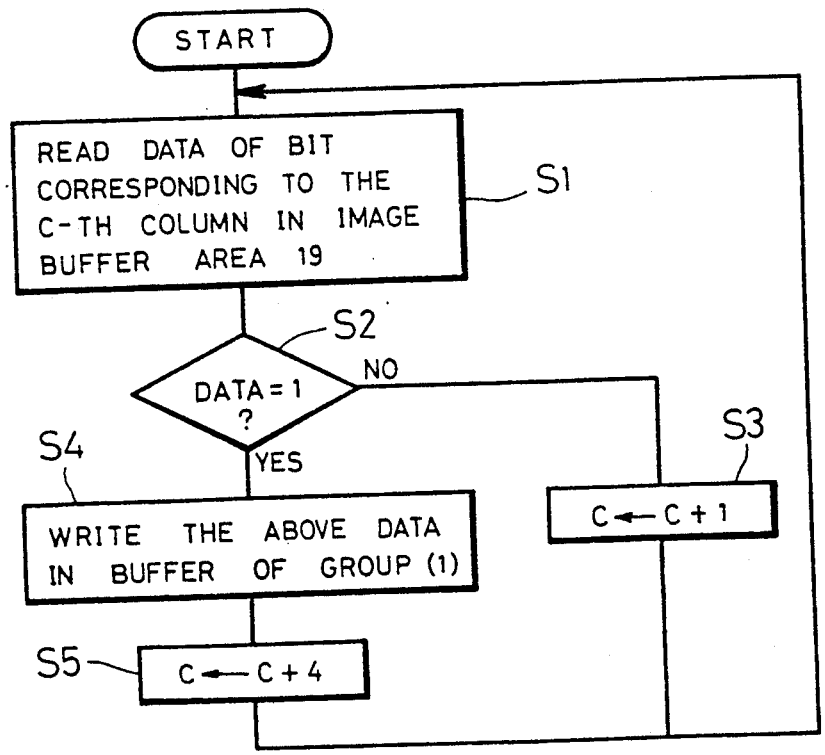
FIG. 3 is a flow chart of the print dot grouping process according to the present invention.

FIG. 3 shows a procedure for selecting print dot data to be grouped into a group (1). In this procedure, the data of bit corresponding to the head column in a printing line (for instance, the 0 column in FIG. 4) in the image buffer area 19 is first retrieved, and the subsequent data are thereafter retrieved. In step S1 the print dot data of bit corresponding to the C-th column is read, and in step S2, it is determined whether the data read is 0 or 1. If the data is 0, the program proceeds to step S3, where 1 is added to C. Then, the program is returned to step S1 Since C=0 is set in the initial state, the retrieval is started at the 0 column. If the data is 1 in step S2, the program proceeds to step S4, and the data is stored in the group (1) image buffer area 71. In each group image buffer area, all the bits, are preliminarily initialized to zero. FIG. 4 shows the result of the above-mentioned procedure. Referring to FIG. 4, when the print dot data is 0 for C=0, and it is 1 for C=1, the data in the group (1) image buffer area is set to 0 for C=0, and it is set to 1 for C=1.

If the data is 1 in step S2, the program proceeds through step S4 to step S5, where 4 is added to C in this embodiment. After step S5, the program is returned to step S1 Then, the data at columns whose number corresponds to the number of column where data was 1 in step S2 plus 1, 2 and 3 are skipped, and the data at the column whose number corresponds to the number of the column where data was 1 in step S2 plus 4 is read. FIG. 4 shows the result of this process. That is, at the column number 3, the print dot data is 1, but the data of corresponding bit in the group (1) image buffer area 71 is 0. Instead, at the column number 5, the data of the bit in the group (1) image buffer area 71 is set to 1, in accordance with the print dot data of 1 in print dot data of this column.

In the case of using the printing styli of two sets, it is enough to group print dot data into two groups, therefore in this embodiment, the remaining dots not assigned to the group (1) are assigned to the group (2). That is, a value obtained by subtracting every bit in the group (1) image buffer area 71 from every bit of the print dot data is stored in the group (2) image buffer area 72. Alternatively, the subtracted value may be rewritten in the image buffer area 19 as a new print dot data. In this case, the data in the image buffer area 19 is used as data of groups (2). The present invention is not limited to the two-sets of printing styli type, it can be also used for a printer having N sets of styli or printing elements in general.

FIG. 5 shows a procedure for grouping the dots into N groups which is utilized in a printer having N sets of printing elements. In this procedure, a subroutine for grouping the dots to a group (1) is first executed. Then, the other dots not grouped are left in the print dot data. Next, a similar process is executed for a group (2) based on the new print dot data, and subsequently the process is repeated (N-1) times. As a result, the data grouping is completed from the group (1) to the group (N-1), and only the data not assigned in any one of the groups are left in the print dot data. This remaining data is grouped into a group (N). Thus, the grouping of all the print dot data is completed.

In the above subroutine for grouping the data, the value to be added in step S5 referring back to FIG. 3 depends on N. That is, if $N=2$, the value to be added is 4. Generally, if $N=n$, $2n$ is added. When the printing head includes n sets of printing elements, the printing speed can be improved such that the printing head moves a distance corresponding to $2n$ columns during a period when the same printing element can be repeatedly driven. As a result, if $N=2$, the printing speed is made four times that of a printer having one-set styli, and if $N=n$, the printing speed is made $2n$ times.

Figure 6:
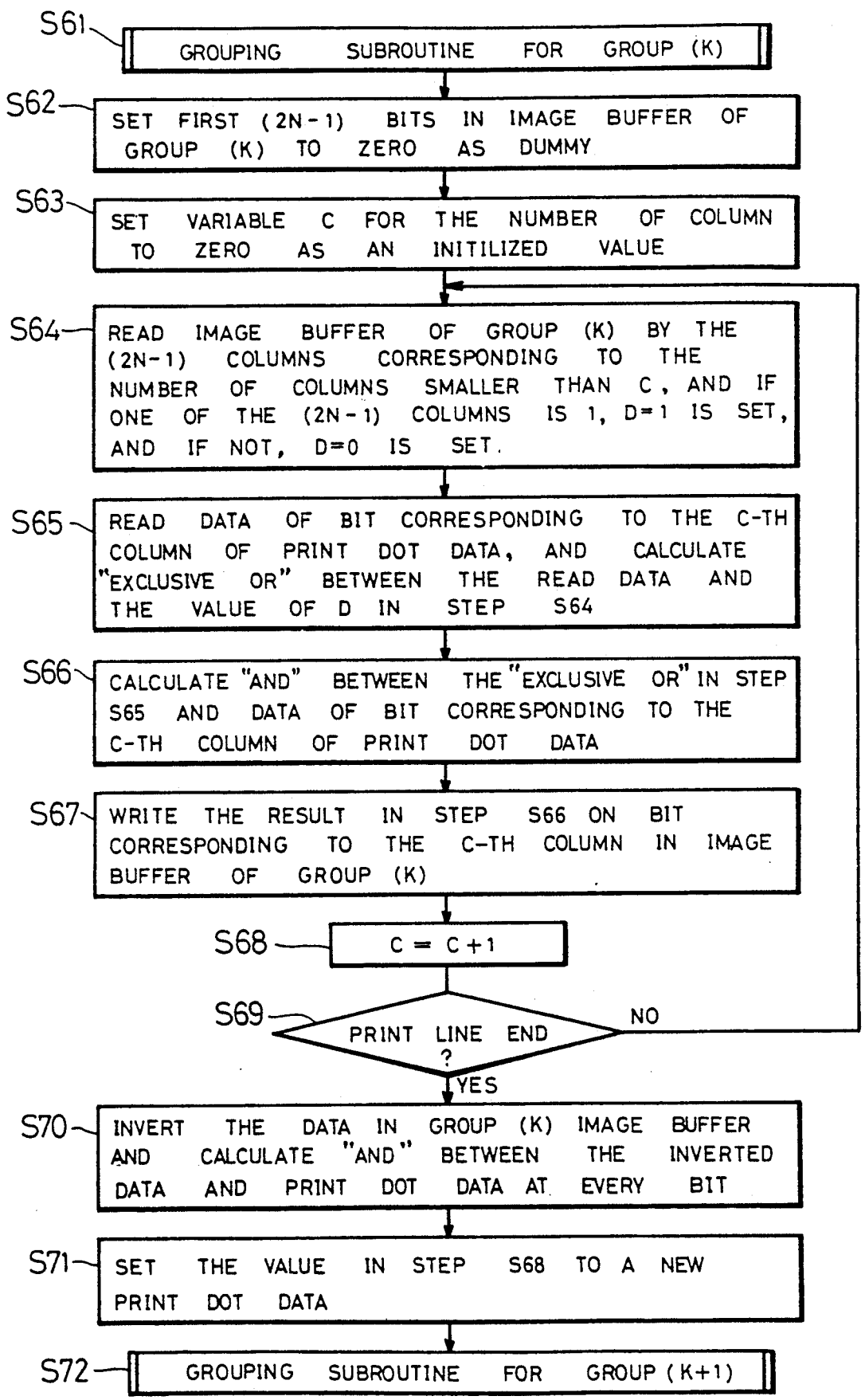
FIG. 6 is a flow chart embodying the procedure shown in FIG. 5.

FIG. 6 shows another preferred embodiment of a subroutine for grouping the dots into N groups. At the beginning of this procedure, all the data at all bits in all group image buffer are initialized to zero. In step S62, zero is set as a dummy at first (2N-1) bits in group (K) image buffer area for the convenience of calculation. In step S63, the retrieval is started from the 0 column. In step S64, it is determined whether or not any one of the data at the columns C-2N-1) to C-1 is 1. If all the data is 0, then $D=0$ is set, while if any one of the data is 1, $D=1$ is set. Therefore, if no data to be printed is present at all the columns from C-(2N-1) to C-1, $D=0$ is set, while if data to be printed is present at any one of the columns, $D=1$ is set. Next, in step S65, the data at the C-th column is read from the print dot data, and an exclusive OR between the data read and the value of D is calculated. The result of calculation of the exclusive OR is shown in FIG. 7. Next, in step S66, AND between the exclusive OR and the print dot data at the C-th column is calculated. Only in the case that $D=0$ is effective (no data to be printed is present at the (2N-1) just prior columns) and the print dot data at the C-th column is 1, the result of AND is 1, while in the other cases, the result of AND is 0. The result in step S66 is written on the bit corresponding to the C-th column in the group (K) image buffer in step S67. Thus, the intended grouping of the data at column (C) is completed.

In step S68, C is increased by 1 to obtain C+1, and in step S69, it is determined whether or not the print dot data grouping of one printing line has been completed. Until the answer in step S69 becomes YES, steps S64 to S67 are repeated, so as to complete the grouping of one printing line to the group (K).

If the answer is YES in step S69, the program proceeds to step S70, where the content of the group (K) image buffer is inverted, and AND is calculated between inverted group (K) image buffer data and print dot data at every bit. As a result, the dots grouped to the group (K) are eliminated from the dot pattern data, and this AND value is set as a new print dot data at every bit. A subroutine of the grouping to the group (K+1) is executed in step S72. This grouping procedure is executed for new print data obtained in step S71, wherein the new print data corresponds to the print dot data not yet grouped into 1 to K groups. The above-mentioned process is executed every printing row in a printing line, and the grouping of print dot data in one printing line is completed.

Although the above mentioned embodiment is of a case where the printing operation is started from the head of the printing line (from the left to the right), the direction of the printing may be reversed, that is, the printing may be started from the end of the printing line (from the right to the left). Such a reverse printing operation follows a subroutine where C is decreased one by one from the final number of columns of one printing line in step S68 in FIG. 6. According to this subroutine, the print dot data is grouped from the end of the one printing line and accumulated in each group image buffer. The data in each group image buffer is read synchronously with the scanning of the printing head from the right to the left. Thus, the characters are printed from the right to the left.

Figure 8:
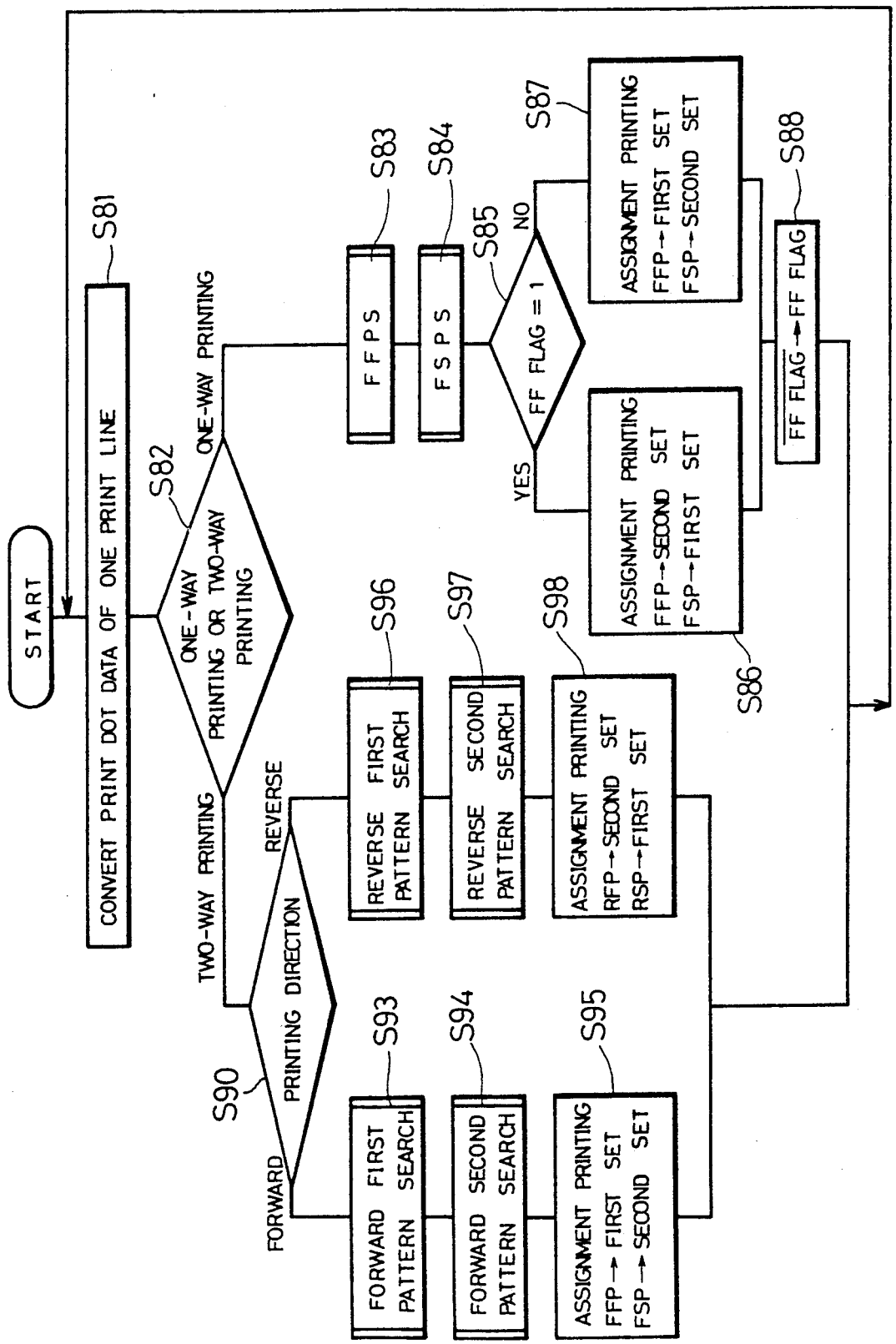
FIG. 8 is an exemplary printing process of the grouped dot data.

FIG. 8 shows a procedure of actually printing the characters. In this embodiment, the printing head has two sets of printing elements and the assignment of each set to a certain grouped dot data is executed in this procedure. FFPS (Forward First Pattern Search) means a subroutine for retrieving the data from the head of a printing line (from the left) and grouping the same to the group (1) image buffer area, and FSPS (Forward Second Pattern Search) means a subroutine for grouping the remaining data into the group (2) image buffer area. On the other hand, RFPS (Reverse First Pattern Seach) means a subroutine for retrieving the data from the end of the printing line (from the right) and grouping the same to the group (1) image buffer area, and RSPS (Reverse Second Pattern Search) means a subroutine for assigning the remaining data to the group (2) image buffer area. FF Flag means a flag to be inverted upon every end of printing of one line from the left to the right.

In step S81, a print character data of one printing line is converted into print dot data, and the program proceeds to step S82. The printer of this embodiment can select a one-way printing mode or a two-way printing mode by a switch operation. In step S82, it is determined whether the printer is in the one-way printing mode or the two-way printing mode. If the printer is in the one-way printing mode where the characters are always printed from the left to the right, the program proceeds to step S83 and subsequent step S84, where the print dot data is retieved from the head of one printing line, and is grouped to the first group (1), while the remaining data is grouped to the second group (2).

Then, the program proceeds to step S85 where it is determined whether or not FF Flag = 1 is effective. As FF Flag is initially zero, the program proceeds to step S87, and the first set of printing styli of the left column ($2_{11}$-$2_{91}$ shown in FIG. 1) are actuated according to the data stored in the first group (1), and then the second set of printing styli of the right column ($2_{12}$-$2_{92}$ shown in FIG. 1) are actuated according to the data stored in the second group (2), thus printing the characters of one printing line.

After the end of the printing operation of one printing line, the FF Flag is inverted in step S88, and then the program is returned to step S81. Next, the same operation is conducted to step S85. As FF Flag = 1 is now effective in step S85, the program proceeds to step S86.

In step S86, the second set of printing styli of the right column are actuated according to the data stored in the group (1), and then the first set of printing styli of the left column are actuated according to the data stored in the second group (2).

Thus, the assignment of each set of printing element to a group image buffer is changed per printing line. As a result, the frequency of use of the set of the printing styli is averaged to thereby extend a life of the printing head.

If it is determined that the two-way printing mode is selected in step S82, a printing direction is determined in step S90. If the printing direction is a forward direction (from the left to the right on the print paper), the print dot data in the image buffer area 19 is retrieved from the head of the printing line in step S93 and subsequent step S94. In step S93, the first retrieved data is grouped to the group (1), and the remaining data is grouped to the group (2). Then, the respective grouped data are stored in the group (1) and (2) image buffer areas 71 and 72. In step S95, the first set of printing styli of the left column are actuated according to the data stored in the group (1), while the second set of printing styli of the right column are actuated according to the data stored in the group (2). After the end of the printing of one line, the program is returned to step S81.

On the other hand, if the printing direction is a reverse direction (from the right to the left) in the two-way printing mode in step S90, the program proceeds to step S96 and subsequent step S97. In steps S96 and S97, the print dot data in the image buffer area 19 are retrieved from the end of the printing line. Then, the first retrieved data are grouped to the group (1), and the remaining data are grouped to the group (2). Then, the respective data grouped as above are stored in the group (1) and (2) image buffer areas 71 and 72.

Thereafter, in step S98, the second set of printing styli of the right column are actuated according to the data stored in the group (1), while the first set of printing styli of the left column are actuated according to the data stored in the group (2).

The above assignment of the sets of styli to the groups of dot data is repeated every time the printing direction is changed forwardly or reversely, thus averaging the frequency of use of the sets of printing styli.

Figure 9:
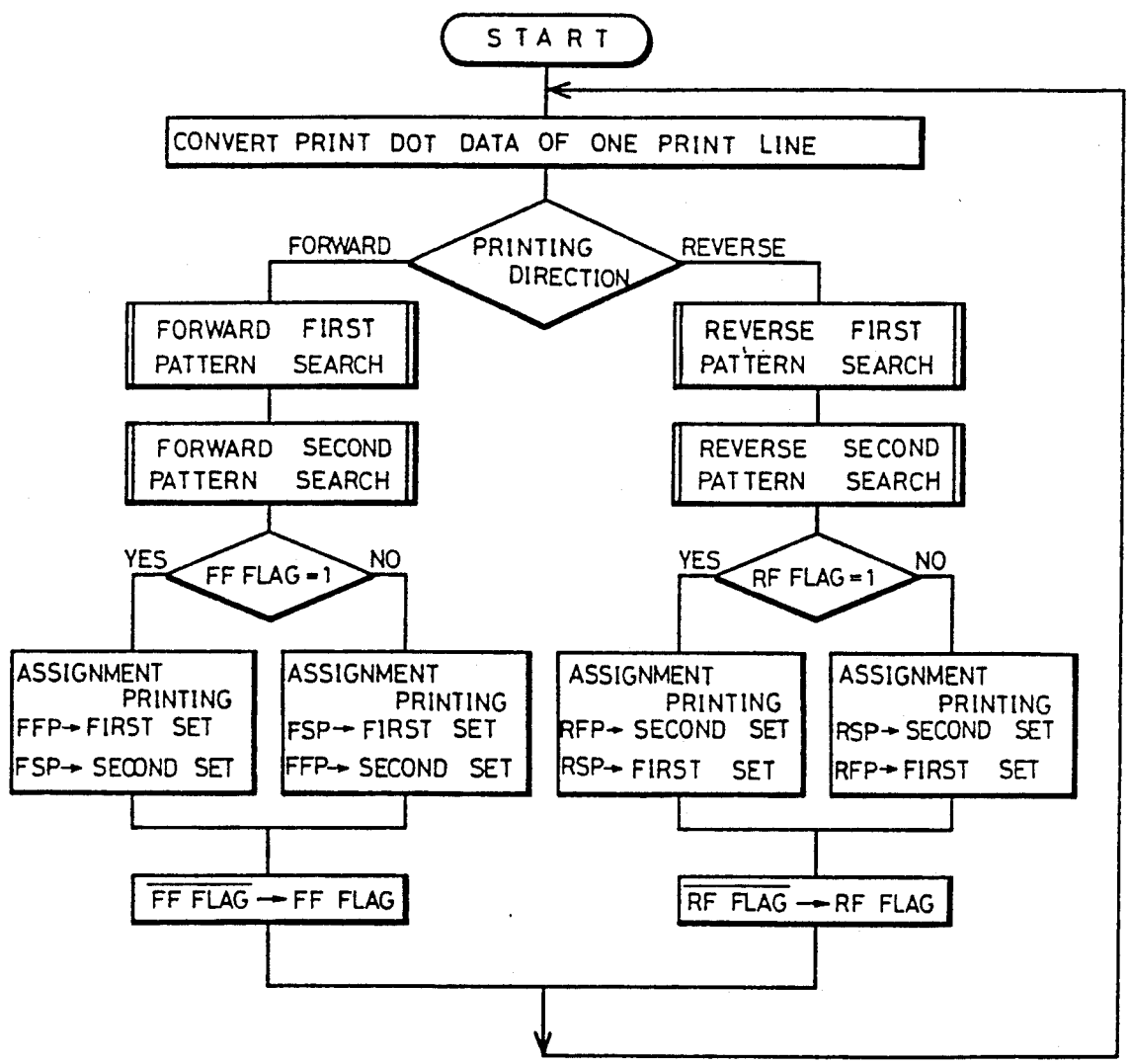
FIG. 9 is another printing process of the grouped dot data.

FIG. 9 shows a second embodiment of the process for assigning the sets to data groups and the printing process. This embodiment is applied to a printer capable of operating the two way printing and the one-way printing similar to the embodiment shown in FIG. 8. In grouping the data to each group according to this embodiment, it is not necessary to determine whether the printing mode is the two-way printing or the one way printing. Therefore, this embodiment employs FF Flag to be inverted every time the printing of one line from the left to the right is ended, and RF Flag to be inverted every time the printing of one line from the right to the left is ended.

When FF Flag and RF Flag are zero in the initial state, and the printing from the left to the right and the printing from the right to the left are alternately carried out, the assignment of the sets of printing styli to dot data groups is exchanged every time the printing head reciprocates after the first left to right printing operation as shown in Table 1.

TABLE 1

|  | Data in Group (1) | Data in Group (2) |
|---|---|---|
| First Left to Right | Second Set | First Set |
| First Right to Left | First Set | Second Set |
| Second Left to Right | First Set | Second Set |
| Second Right to Left | Second Set | First Set |
| Third Left to Right | Second Set | First Set |
| Third Right to Left | First Set | Second Set |

In the case of the one-way printing mode, the assignment of the sets of printing styli to the dot data groups is exchanged every time the printing of one line is ended in the same manner as of the embodiment shown in FIG. 8.

Figure 10:
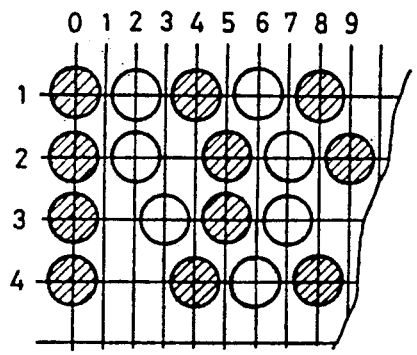
FIGS. 10 and 11 are printed patterns obtained in accordance with the present invention.

FIG. 10 shows a status of the dots grouped to the two groups according to the print control system of the present invention. The hatched dots are grouped to the group (1) and the non-hatched dots are grouped to the group (2). As to the first row, when the dot at the column 0 is grouped to the group (1), the dots at the columns 1 to 3 are not grouped to the group (1), and the dots at the column 4 and the later may be grouped again to the group (1). As to the second row, since the dot at the column 0 is present, the dots at the column 4 and the later may be grouped to the group (1). But, since a print dot is absent at the column 4, the dot at the column 5 is grouped to the group (1).

Figure 11:
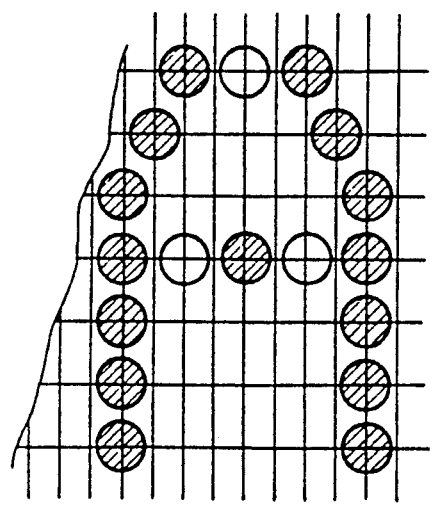

FIG. 11 shows a grouped pattern in printing a character "A", wherein the hatched dots are grouped to the group (1), and the non-hatched dots are grouped to the group (2). As appreciated from FIG. 11, the dots arranged with four or more print pitches are preferentially grouped to the first group, and the dots arranged with three or less print pitches with respect to the previously grouped dots in the first group are grouped to the other group.

Accordingly, the sets of printing styli assigned to the group (1) are used more times, causing the shortening of a life of the styli. According to the printer of this embodiment, the assignment of sets of printing styli to grouped dot data is suitably exchanged in accordance with the procedure shown in FIGS. 8 and 9, so that the frequency of use of the sets of printing styli may be averaged to extend an effective life.

As is apparent from FIGS. 10 and 11, the print pattern grouped in a group in the embodiment does not include any dot data to be printed at adjacent three or less column positions in any line. That is, the subsequent data grouped in a group is present at the column position apart from the last data with four or more pitches. This print pattern is well known from U.S. Pat. No. 3,627,096 as previously referred. This print pattern is such that the dots arranged with four or more print pitches are preferentially assigned to the first group (1), and all the remaining dots are assigned to the second group (2). In other words, although the present invention utilizes a character pattern similar to that incorporated in the printer as disclosed in U.S. Pat. No. 3,627,096, a printing speed can be increased by merely modifying the printing head and the control device.

Figure 12:
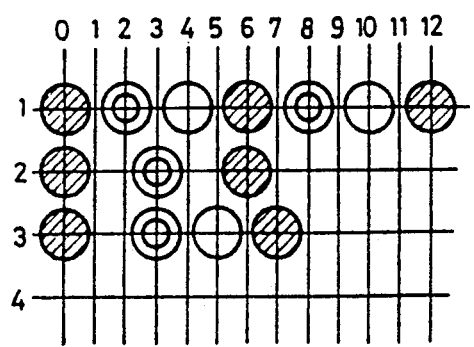
FIG. 12 is an illustration of the assigned dots in a modified embodiment using three-sets of printing styli.
Figure 13:
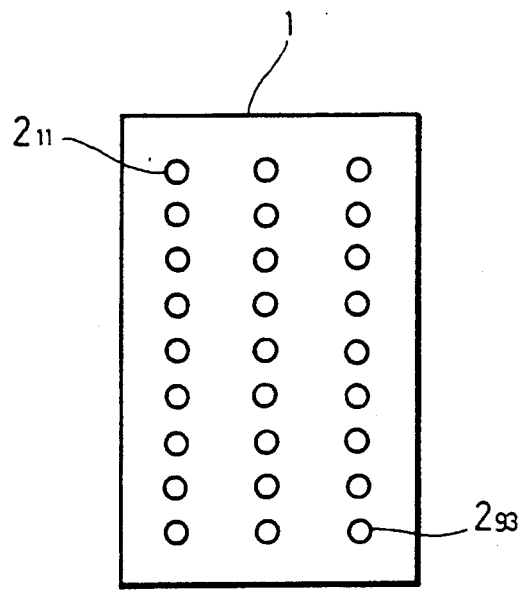
FIGS. 13 to 16 are some examples of the printing head controllable by the present invention.

FIG. 12 shows a grouped dot pattern in the case of using three sets of styli as shown in FIG. 13. Referring to FIG. 12, the hatched dots are grouped to the group (1), and the double circled dots are grouped to the group (2), and the non-hatched dots are grouped to the group (3). Such grouping of the dots is conducted in accordance with the flow charts shown in FIGS. 3 and 6. In this case, the value to be added in step S5 in FIG. 3 is changed to 6, and that the data read in step S64 in FIG. 6 is changed to the data of the last five columns.

According to this embodiment, the dots to be printed with six or more pitches are preferentially grouped to the group (1), and the dots in the remaining data to be printed with six or more pitches are then grouped to the group (2), and all the remaining dots are finally grouped to the group (3). Accordingly, this type printer may attain a printing speed six times that having one-column printing styli.

The system of the present invention may be naturally applied to any printer having three or more sets of styli. Generally, in a printer having N sets of printing styli, the data is grouped into N groups, provided that the adjacent dots in each group are arranged with 2N or more pitches, thus obtaining a printing speed 2N times that of the printer having one-column styli. Furthermore, the system of the present invention may change the assignment of sets of printing elements to grouped dot data desirably, so that the frequency of the use of each set is averaged and the life of the printing head becomes longer.

Figure 14:
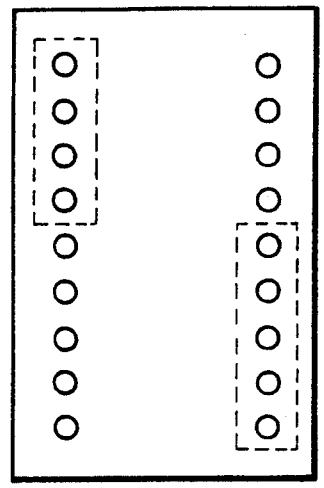
Figure 15:
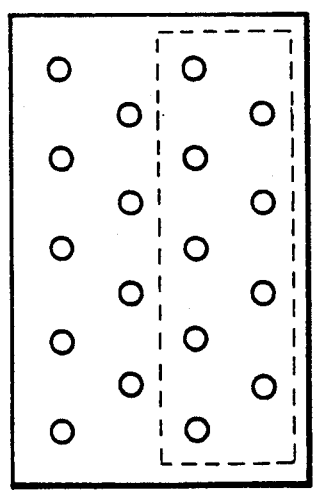
Figure 16:
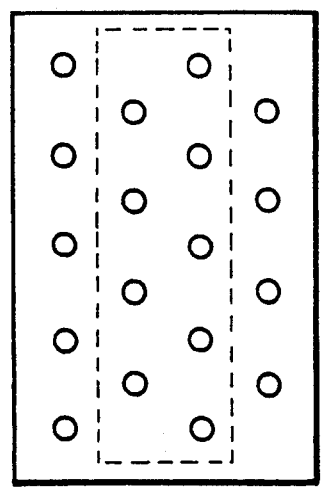

A manner of arrangement of each set of the printing styli is not limited to the embodiments shown in FIGS. 1 and 13. For example, the manners shown in FIGS. 14, 15 and 16 are employable. In these cases, the styli enclosed by dotted line are grouped into one set, and the other styli are grouped to the other set. However, the styli may be appropriately grouped, provided that each set of styli includes one stylus at each row.

Although the above-mentioned embodiments employ the printing styli as a printing element, the present invention is applicable to an ink jet printer and a thermal printer having at least two sets of printing elements.

What is claimed is:

1. A control system for a dot printer which prints a dot according to dot data indicating whether or not said dot is to be printed at an intersection defined by a row and a column under the limitation that it is not allowed to print two dots at both the adjacent intersections in the same row, said dot printer having a printing head mounting two printing elements thereon per row along a moving direction of said printing head, said two printing elements being selectively driven accordingly to a moving position of said printing head and said dot data to print said dot at said intersection on a printing paper; said control system comprising:
    (a) means for grouping into two groups print dot data existing at intersections on each row where dots are to be printed according to said dot data for all the intersections containing said print dot data in each row, wherein said grouping means first assigns into one of said two groups a first dot at said intersection in each row containing said print dot data and a subsequent fourth intersection after the previously assigned dot in said row if said fourth intersection exists and contains one of said print dot data or a next intersection existing and containing one of said print dot data after said fourth intersection in said row and secondly assigns into the other group the remaining intersections of each row with said print dot data not grouped in the first grouping step;
    (b) means for driving said printing elements on the basis of the data grouped to each group; and
    (c) means for moving said printing head by four columns during a period of time equal to the inverse of the repetition rate of the printing elements.

2. The control system as defined in claim 1, further comprising a buffer means for storing each data grouped by said grouping means.

3. The control system as defined in claim 1, further comprising a selecting means for selecting the assignment of said each grouped dot data assignable to said each printing element.

4. The control system as defined in claim 3, further comprising a paper feeding mechanism for feeding said printing paper in a direction perpendicular to the moving direction of said printing head and updating a printing line on said printing paper opposed to said printing head, wherein said selecting means select said assignment on the basis of the updating of the printing line.

5. The control system as defined in claim 4, wherein said selecting means select said assignment every time said printing head is driven to print one printing line.

6. The control system as defined in claim 4, wherein said selecting means is adapted to select said assignment in response to the selection between a forward printing mode where the printing operation is carried out from one end of the printing line to the other end in the moving direction of said printing head and a reverse printing mode where the printing operation is carried out from the other end of the printing line to the one end.

7. The control system as defined in claim 4, wherein said selecting means includes a flag setting means for setting flags for every printing operation of one printing line independently in a forward printing mode where the printing operation is carried out from one end of the printing line to the other end in the moving direction of said printing head and a reverse printing mode where the printing operation is carried out from the other end of the printing line to the one end, and a flag determining means for determining each flag, wherein said assignment is selected according to the determination of each flag.

8. The control system as defined in claim 1, wherein said printing elements are located on each row forming a dot matrix and are grouped into two sets of said printing elements, each set including one of said printing elements per row, while said grouping means groups said print dot data to be printed into two groups for every row of the dot matrix to thereby assign one of the two sets of said printing elements to one of the two groups of said grouped print dot data.

9. The control system as defined in claim 8, wherein said printing elements are arranged in columns substantially perpendicular to rows for each group.

10. A control system for a dot printer which prints a dot according to dot data indicating whether or not said dot is to be printed at an intersection defined by a row and a column under the limitation that it is not allowed to print two dots at both the adjacent columns in the same row, said dot printer having a printing head mounting n printing elements thereon per row along a moving direction of said printing head, where n is equal to or greater than 3, said printing elements being selectively driven according to a moving position of said printing head and said dot data to print said dot at said intersection on a printing paper; said control system comprising:
    (a) means for grouping into n groups print dot data existing at intersections on each row where dots are to be printed according to said dot data for all the columns containing said print dot data in each row, wherein said grouping means first assigns into a first group of said n groups a first dot of said intersection in each row containing said print dot data and a subsequent 2n−th intersection after the previously assigned dot in said row if said 2n−th intersection exists and contains one of said print dot data or a next intersection existing and containing one of said print dot data after said 2n−th intersection in said row, and incrementally assigns into next groups of said n groups a first intersection containing one of said print dot data for the row not grouped in a previous grouping step, and finally assigns into an n-th group of said n groups the remaining intersections of the row with said print dot data not grouped in an (n−1)−th grouping step;

(b) means for driving said printing elements on the basis of the data grouped to each group; and (c) means for moving said printing head by 2n columns during a period of time equal to the inverse of the repetition rate of the printing elements.

11. The control system as defined in claim 10, further comprising a buffer means for storing each group of data grouped by said grouping means.

12. The control system as defined in claim 10, further comprising a selecting means for selecting the assignment of said each grouped dot data assignable to said each printing element.

13. The control system as defined in claim 10, wherein said n printing elements are located on each row forming a dot matrix, and are grouped into n sets of said printing elements each set including one of said printing elements per row, while said grouping means groups said dot data to be printed into n groups for every row of the dot matrix to thereby assign one of the n sets of said printing elements to one of the n groups of said grouped dot data.

14. The control system as defined in claim 12, further comprising a paper feeding mechanism for feeding said printing paper in a direction perpendicular to the moving direction of said printing head and updating a printing line on said printing paper opposed to said printing head, wherein said selecting means is adapted to select a sequence of a set of numbers 1 to n or a sequence from n to 1 for said assignment on the basis of the updating of the printing line.

15. A control system for as dot printer which prints a dot according to dot data indicating whether or not said dot is to be printed at an intersection defined by a row and a column under the limitation that it is not allowed to print two dots at both the adjacent columns in the same row, said dot printer having a printing head mounting a plurality of printing elements thereon per row along a moving direction of said printing head, said printing elements being selectively driven according to a moving position of said printing head and said dot data to print said dot at said intersection on a printing paper; said control system comprising:

means for grouping into a number of groups equal to said number of said printing elements per row print dot data existing at intersections on each row where dots are to be printed according to said dot data for all the intersections containing said print dot data in each row, wherein said grouping means includes means for retrieving grouped data from intersections just antecedent to an intersection to be grouped and spaced a distance less than a moving distance of said printing head during a period of time equal to the inverse of the repetition rate of the printing elements, calculating an index value (D) such that when all the data retrieved are 0, said index value (D) is set to be 0, while when at least one of the data retrieved is 1, said index value (D) is set to be 1, calculating exclusive OR between said index value (D) and the data at intersections to be assigned calculating AND between the data at intersections to be assigned and said exclusive OR, inputting said AND as a grouped data for intersections to be assigned, whereby the print dot data at intersections spaced said distance which is less than the moving distance of said printing head during the period of time equal to the inverse of the repetition rate of the printing element are not grouped into the same group.

16. A printing method for printing a dot according to dot data indicating whether or not said dot is to be printed at an intersection defined by a row and a column under the limitation that it is not allowed to print two dots at both the adjacent columns in the same row, said printing method comprising:

(a) a first step for grouping into two groups print dot data existing at intersections on each row where dots are to be printed according to said dot data for all the intersections containing said print dot data in each row, wherein a first intersection containing one of said print dot data in said row is first assigned into one of said two groups, and a subsequent fourth intersection after the last grouped intersection if said fourth intersection exists and contains one of said print dot data or a next intersection existing and containing one of said print dot data after said existing fourth intersection in said row is also assigned into one of said two groups, and the remaining intersections with said print dot data not grouped in the first grouping step are secondly assigned into the other group;

(b) a second step for assigning each group grouped in the first step to a plurality of printing elements arranged in the same column along a moving direction of a printing head; and (c) a third step for selectively driving each of said printing elements on the basis of the print dot data of the group assignable to said each printing element in accordance with a moving position of said printing head.

17. The printing method as defined in claim 16, wherein said second step determines the assignment of said each grouped print dot data assignable to said each printing element for each line printing operation.

18. A control system for a dot printer which prints a dot according to dot data indicating whether or not said dot is to be printed at an intersection defined by a row and a column under the limitation that it is not allowed to print two dots at both the adjacent columns in the same row, said dot printer having a printing head mounting two printing elements thereon per row along a moving direction of said printing head, said two printing elements being selectively driven according to a moving position of said printing head and said dot data to print said dot at said intersection on a printing paper; said control system comprising:

(a) an image buffer means for storing data to be printed in a dot pattern state;

(b) a first obtaining means for obtaining from the data stored in said image buffer means data at column positions spaced a distance equal to or greater than a moving distance of said printing head during a period of time equal to the inverse of the repetition rate of a printing element with said first obtaining means obtaining data from a first intersection containing said data and obtaining data from a subsequent fourth intersection after said first intersection if said fourth intersection exists and contains said data or obtaining data for a next intersection having said data after said fourth intersection.

19. The control system as defined in claim 18, further comprising a first image buffer means for storing the data obtained by said first obtaining means and a second image buffer means for storing the data obtained by said second obtaining means.

20. The control system as defined in claim 18, further comprising a selecting means for selecting the assignment of said each grouped dot data assignable to said each printing element.

* * * * *